United States Patent [19]
Downen et al.

[11] 3,906,835
[45] Sept. 23, 1975

[54] FLUID MOTOR CONTROL SYSTEM WITH MANUAL AND SELF-CYCLING MODES OF OPERATION

[75] Inventors: Ronald L. Downen, Plainfield; Leon E. Hicks, Joliet, both of Ill.

[73] Assignee: Caterpillar Tractor Company, Peoria, Ill.

[22] Filed: Jan. 14, 1974

[21] Appl. No.: 432,967

[52] U.S. Cl. .................. 91/308; 91/318; 91/453
[51] Int. Cl.² ...................................... F01L 25/06
[58] Field of Search ......... 91/318, 308, 7, 282, 317, 91/290

[56] References Cited
UNITED STATES PATENTS

| | | | |
|---|---|---|---|
| 864,662 | 8/1907 | Lundquist | 91/282 |
| 2,379,180 | 6/1945 | Pohl | 91/318 |
| 2,537,680 | 1/1951 | Kupiec et al | 91/318 |
| 2,757,641 | 8/1956 | Meddock | 91/318 |
| 3,225,663 | 12/1965 | Pelisson | 91/308 |

*Primary Examiner*—Paul E. Maslousky
*Attorney, Agent, or Firm*—Phillips, Moore, Weissenberger, Lempio & Strabala

[57] ABSTRACT

A fluid operated linear motor is coupled to a control valve for directing pressurized fluid to a selected end of the motor to cause motor extension or retraction. The control valve may be operated either manually or by self-actuating means which causes the control valve to reverse the motor automatically at the end of each stroke. The self-actuating means has a construction which does not add any significant drag or frictional resistance to manual operation of the control valve.

10 Claims, 2 Drawing Figures

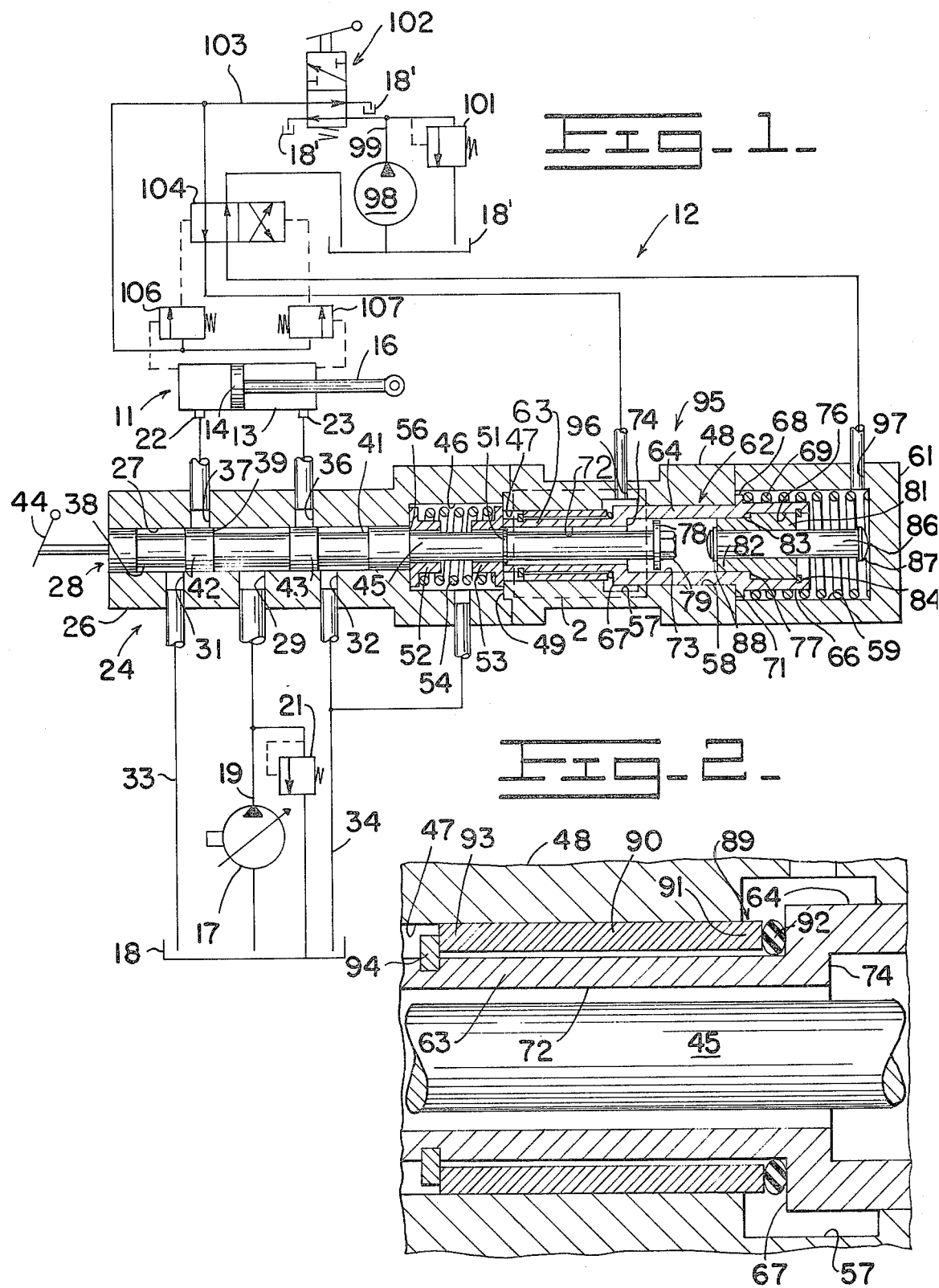

FLUID MOTOR CONTROL SYSTEM WITH MANUAL AND SELF-CYCLING MODES OF OPERATION

BACKGROUND OF THE INVENTION

This invention relates to fluid pressure driven motors and more particularly to control means therefor.

Fluid motors, also known by various other terms such as hydraulic or pneumatic cylinder, fluid actuator or fluid jack, are widely used in a variety of mechanisms for shifting one element relative to another. A typical fluid operated motor has a cylinder member with a piston therein and has a rod extending axially into the cylinder member to connect the piston to some external element which is to be moved by the motor. Fluid ports are provided at each end of the cylinder member and by admitting pressurized fluid to one port while venting the other, the motor may be caused to extend or retract. To actuate the motor and to select the direction of movement, a control valve is connected between the cylinder ports, and a source of pressuized fluid and a fluid drain.

In many situations, the control valve is manually operated through a control lever or the like. In other usages, control mechanism may be provided for automatically manipulating the control valve to reverse the motor at the end of each extension and retraction stroke. In situations where it is desired to provide for either manual or automatic control of the valve, the prior control mechanisms have been subject to a significant disadvantage.

In particular, automatic operation has been provided for by coupling a smaller auxiliary fluid motor to the spool or other valving element of the control valve in order to shift the valve spool between positions at the appropriate times. Tight seals must generally be provided between the piston and cylinder and between the rod and cylinder of the auxiliary motor in order to prevent fluid leakage. The presence of such seals has introduced substantial frictional resistance to movement of the control valve spool. While this resistance or drag is not of particular concern in the automatic mode of operation, it is undesirable when the control valve is to be operated manually. As a result of the resistance to control valve operation which is introduced by the presence of conventional self-cycling means, an excessive amount of operator effort has been required to manually shift the control valve and it has been necessary to form control levers, linkages and other manual control elements with an undesirably heavy and bulky configuration.

SUMMARY OF THE INVENTION

This invention is a control system for a fluid pressure operated motor including a control valve which may optionally be actuated manually or with a self-cycling action which automatically reverses the motor at the end of each retraction and extension stroke. The presence of the self-cycling mechanism creates no significant additional resistance or drag when the control valve is operated manually. Self-cycling operation is provided for by coupling a fluid pressure actuated mechanism to the valve spool or the like of the control valve in an arrangement in which manual movement of the valve spool or the like may be accomplished without moving any resistive elements of the self-cycling mechanism.

Accordingly it is an object of this invention to provide control means for a fluid motor offering the option of manual control or self-cycling in which only a small force is required to operate the control valve in the manual mode of operation.

The invention together with further objects and advantages thereof will best be understood by reference to the following description of a preferred embodiment taken in conjunction with the accompanying drawings.

BRIEF DESCRIPTION OF THE DRAWINGS

In the accompanying drawings:

FIG. 1 illustrates a linear fluid motor and a control system therefor embodying the invention in which a control valve and self-cycling actuator means for the valve are shown in axial section view and in which other components of the system are shown schematically, and FIG. 2 is an enlarged view of the portion of FIG. 1 enclosed by dashed line 2 thereon.

DESCRIPTION OF A PREFERRED EMBODIMENT

Referring initially to FIG. 1 of the drawing, a fluid motor 11 of the form to which the control system 12 may be applied typically has a closed cylinder member 13 with a slideable piston 14 therein and has a rod 16 which extends axially from the piston through one end of the cylinder member for connection with mechanism which is to be operated by the motor. Pressurized fluid for operating the motor 11, which may typically be oil, is supplied by a pump 17 drawing from a reservoir 18 and having a pressurized fluid outlet conduit 19. To establish a constant pressure in the outlet conduit 19 and to return fluid to reservoir 18 when the motor 11 is inactive, a relief valve 21 may be connected between conduit 19 and reservoir 18.

To selectively transmit fluid from pump outlet 19 to either a head end port 22 or rod end port 23 of motor 11, while venting the other port to reservoir 18, a control valve 24 is connected between the pump and motor. Control valve 24 may typically have a housing 26 with a bore 27 in which an axially moveable valve spool 28 is disposed. Outlet conduit 19 from pump 17 connects with an inlet passage 29 that opens into a central region of bore 27 and the housing also has drain passages 31 and 32 spaced from inlet passages 29 at opposite sides thereof. Drain passages 31 and 32 are communicated with reservoir 18 by drain lines 33 and 34 respectively. A first outlet passage 36 in housing 28 is communicated with rod end port 23 of the motor 11 and is situated between housing passages 29 and 32 while a second outlet passage 37 opens into bore 27 between passages 29 and 31 and communicates with the head end port 22 of the motor.

Spool 28 is provided with three coaxial annular grooves 38, 39 and 41 with grooves 38 and 39 being separated by a land 42 while grooves 39 and 41 are separated by another land 43. The spool 28 is proportioned to enable land 42 to block outlet passage 37 while land 43 blocks outlet passage 36 when the spool is at a centered position within bore 27. Thus at the centered position of the spool, the pressurized fluid inlet passage 29 is blocked from both outlet passages 36 and 37 and from drain passages 31 and 32 as well. Under this condition, the output of pump 17 is returned directly to reservoir 18 by relief valve 21. Spool 28 may be shifted, leftwardly as viewed in FIG. 1, to a Motor Extend position at which inlet 29 is communicated with outlet 37 while outlet 36 is communicated to drain passage 32, thereby causing the motor 11 to undergo extension. Spool 28 may be shifted in an opposite direction to a Motor Retract position to communicate inlet passage 29 with outlet passage 36 while communicating outlet passage 37 to drain passage 31 thereby causing motor 11 to contract. The control valve spool 28 may be shifted manually by a conventional operator's control lever 44 or other equivalent means.

To provide a resilient force urging the spool 28 towards the centered postion at which motor 11 is inactive, a larger diameter counterbore 46 in housing 26 forms an extension of bore 27. A reduced diameter extension 45 of the valve spool 28 extends through counterbore 46 and into a bore 47 of an actuator housing 48 which is secured to the control valve housing 26 for purposes to be hereinafter described. Bore 47 of the actuator housing is of slightly less diameter than the counterbore 46 of the control valve housing and thus an annular shoulder 49 is formed at the end of the counterbore. An annular snap ring 51 is seated in valve spool extension 45 at the position of shoulder 49 when the valve spool is in the above described centered position. A pair of annular washers 52 and 53 are disposed coaxially around spool extension 45 within counterbore 46 and a compression spring 54 is disposed coaxially in the counterbore to bear against the two washers 52 and 53. With the valve spool 28 in the centered position, spring 54 causes washer 53 to seat against the shoulder 49 and snap ring 51 while causing the other washer 52 to seat against the step 56 at the juncture between the valve spool 28 and spool extension 45. Movement of the valve spool 28 in either direction from the centered position causes spring 54 to be compressed and to exert a force tending to restore the spool to the centered position. Accordingly, the spool 28 reverts to the centered position at which motor 11 is inactivated unless the spool is forcibly held at the Motor Extend or Motor Retract position.

It may be seen that the control system 12 as described to this point, provides for manual control of the motion of motor 11 in an essentially conventional manner. Considering now the additional components of the system which provide for optional automatic or self-cycling of the motor 11 without complicating manual control, the bore 47 of actuator housing 48 extends to an internal groove 57 in the housing and an additional larger diameter bore 58 extends from the groove to communicate with a still larger diameter chamber 59 in an end member 61 which is secured to housing 48 at the opposite end from control valve 24. A stepped tubular piston 62 has an end 63 which extends axially within bore 47 and which has an outside diameter substantially smaller than that of bore 47. An intermediate portion 64 of the piston extends through bore 58 and has a diameter conforming therewith while an opposite end portion 66 of the piston is within end member chamber 59 but of smaller diameter than chamber 59.

An annular shoulder 67 is formed where piston portion 63 joins piston portion 64 and a flange 68 is provided on the piston within chamber 59. A compression spring 69 within chamber 59 urges the flange 68 against the shoulder 71 at the juncture between bore 58 and the larger diameter chamber 59. An axial bore 72 through piston portion 63 connects with a larger diameter bore 73 within piston portion 64 at a shoulder 74 and bore 73 in turn connects with a still larger diameter bore 76 with piston portion 66 at a shoulder 77.

The control valve spool extension 45 extends through piston end portion bore 72 and into the intermediate bore 73 thereof. Within bore 73, a flange is formed on the end of the spool extension in this instance by an annular washer 78 secured to the end of the extension by a bolt 79. The length of spool extension 45 is selected to locate flange 78 in spaced relation from shoulder 74 when the valve spool 28 is at the centered position. The spacing of flange 78 from shoulder 74 enables the control valve spool 28 to be manually shifted to the Motor Extend position before the flange contacts the shoulder.

A tubular bushing 81 is disposed coaxially in piston bore 76 and has a reduced diameter extension 82 which extends a short distance into the adjacent piston bore 73, the bushing having an annular shoulder 83 which abuts shoulder 77. A snap ring 84 seated within piston bore 76 holds the bushing within the piston. A rod like plunger 86 extends axially through the bushing 81 and has a flange 87 at the end within end member chamber 59 while a snap ring 88 is seated in the opposite end within piston bore 73. Plunger 86 has a length sufficiently greater than that of the bushing 81 so that when piston flange 68 is seated against shoulder 71 and plunger snap ring 88 is seated against bushing 81, the opposite flange 87 end of the plunger contacts the end wall of end member 61. Spool extension 45, piston 62 and plunger 86 are proportioned to enable the control valve spool 28 to be manually shifted to the Motor Retract position before movement is stopped by contact of the end of the spool extension, specifically the bolt 79 in this example, against the end of the plunger with the plunger in turn being abutted against the end of chamber 59. Accordingly, the actuator structure does not significantly resist manual shifting of the control valve spool 28 to any of the three positions thereof.

While the smaller diameter portion 63 of the piston 62 might be machined to have an outside diameter similar to the inside diameter of the actuator bore 47, manufacturing complication is reduced in this example by forming piston portion 63 with a substantially smaller diameter than bore 47. As a result the bores of actuator housing 48 need not be as precisely aligned with the bore of control valve housing 26 as would otherwise be the case. Given this construction, it is necessary to prevent the escape of fluid through actuator housing bore 47 and a floating seal assembly 89, best seen in FIG. 2, is provided for this purpose. In particular, a cylindrical sleeve 90 is disposed coaxially within actuator housing bore 47 and has an inside diameter substantially greater than the outside diameter of piston portion 63 to allow for some slight misalignment therebetween. One end 91 of sleeve 90 compresses an annular elastomeric seal 92 against shoulder 67 of the piston. The opposite end 93 of sleeve 90 abuts a snap ring 94 seated in piston portion 63 whereby the snap ring holds the sleeve in position and maintains compression on the seal 92.

Referring again to FIG. 1, the above-described self actuator means 95 enables shifting of the control valve spool 28 in response to fluid signals inasmuch as a first fluid signal passage 96 communicates with actuator groove 57 while a second fluid signal passage 97 communicates with end member chamber 59. If pressurized fluid is admitted to passage 96, the fluid passage acting on piston shoulder 67 shifts the piston in the direction of end member 61 and after a period of free travel, piston shoulder 74 contacts washer 78 and thereafter control valve spool 28 is forcibly shifted to the Motor Retract position. Conversely, if pressurized fluid is admitted to passage 97, the fluid pressure acting against the flanged end 87 of plunger 86 drives the plunger towards spool extension 45 and after a period of free travel, the plunger contacts bolt 79 and thereafter forces the control valve spool 28 to the Motor Extend position. Automatic control of the motor 11 may thus be realized by pressurizing and venting the actuator passages 96 and 97 at appropriate times to accomplish the necessary shifting of control valve spool 28.

Considering now circuit components which may be coupled to actuator passages 96 and 97 to cause the motor 11 to repeatedly extend and retract without continued manual control, pressurized fluid for such purposes is in this example provided by a second pump 98 drawing hydraulic fluid from a reservoir 18'. A relief valve 101 is connected between the pump outlet 99 and reservoir 18' to maintain a predetermined constant pressure in conduit 99. It should be understood that pressurized fluid for operating the actuator could, if desired, be derived from the same pump 17 that operates the motor 11, but it is frequently preferable to use a separate pump for control purposes. Usually, smaller fluid pressures are satisfactory for the actuator and the use of a separate smaller pump avoids a need for heavy hoses and components of the kind needed for containing very high fluid pressures.

A two position manually operated actuator on-off valve 102 is connected between pump outlet 99 and a control fluid line 103. In the Off position of valve 102, fluid from pump outlet 99 is returned through the valve to reservoir 18' while the control fluid line 103 is vented to the reservoir. In the On position of valve 102, pump outlet 99 is communicated with control fluid line 103 to transmit pressurized fluid thereto. A pilot operated two position reversing valve 104 has a first position at which conduit 103 is communicated with actuator passage 96 while actuator passage 97 is communicated with reservoir 18' and has a second position at which passage 97 is communicated with conduit 103 while passage 93 is vented to the reservoir. With valve 102 in the On position, the with valve 104 in the first position, the actuator forces the control valve to the Motor Retract position in the manner hereinbefore described. Upon shifting of the reversing valve 104 to the second position, the actuator forces the control valve 24 to the Motor Extend position as previously described.

A first pilot operated sequencing valve 106 is connected between conduit 103 and valve 104 and is normally closed but may be opened by a pilot signal to supply pilot pressure to one end of valve 104. Similarly a second pilot operated and normally closed sequencing valve 107 is connected between conduit 103 and the other end of the reversing valve 104. Sequencing valve 106 is connected to the head end of motor 11 to be piloted to the open position by a predetermined pressure increase at the head end of the motor while sequencing valve 107 is piloted to the open position by a predetermined pressure rise at the rod end of the motor 11.

Considering now the operation of the system in the self-cycling or automatic mode, valve 102 may be manually shifted to the On position to direct pressurized fluid to actuator passage 96 or 97 depending on the position of reversing valve 104 at that time. If reversing valve 104 is in the position depicted in FIG. 1, pressure is transmitted to actuator passage 96 while actuator passage 97 is vented to the reservoir. This shifts control valve 24 as previously described to cause motor 11 to retract. When the piston 14 of motor 11 bottoms out against the head end of cylinder 13 pressure in the rod end of the motor increases abruptly and this pilots sequencing valve 107 to the open position. Opening of blocker valve 107 then pilots the reversing valve 104 to the alternate position at which high pressure fluid is transmitted to actuator passage 97 while actuator passage 96 is then vented to reservoir 18'. The actuator 95 then shifts motor control valve 24 to the Motor Extend position in the manner previously described. When the motor 11 reaches full extension, an abrupt pressure rise occurs in the head end of the motor and this pilots the other sequencing valve 106 to the open position. This again shifts the reversing valve 104 to re-establish the conditions under which the motor 11 is caused to retract. Accordingly, motor 11 alternately extends and retracts to accomplish the desired automatic reciprocation.

To stop the automatic sequencing of motor 11, valve 102 may be restored to the Off position at which both actuator passages 96 and 97 are vented to the reservoir. Springs 54 and 69 then restore the motor control valve 24 to the centered position at which the motor 11 is inactive and also restore the components of the actuator to the positions depicted in FIG. 1 with the possible exception of the position of plunger 86 which may be freely moved within bushing 81 as long as the end member chamber 59 is vented. Accordingly, control valve 28 is restored to the Motor Inactive position and may then be manually operated by lever 44 as desired.

While the invention has been described with respect to control of a linear fluid motor 11, it will be apparent that it is also applicable to other forms of fluid motor such as certain types of reversible rotary fluid motor. Similarly, while the invention has been described with respect to a motor actuated with a hydraulic fluid such as oil, it may also be adapted to pneumatic systems.

Thus while the invention has been described with respect to a single preferred embodiment it will be apparent that many variations are possible and it is not intended to limit the invention except as defined in the following claims.

What is claimed is:

1. A control system for a fluid pressure operated motor having a first port which may be pressurized to produce motor operation in one direction and having a second port which may be pressurized to produce motor operation in an opposite direction, comprising:

a motor control valve having a pressurized fluid inlet and drain means and first and second outlets for connection to said first and second motor ports respectively, said control valve further having a valving element shiftable between at least three positions including a first position at which both of said outlets are closed and a second position at which said first outlet is communicated with said inlet and a third position at which said second outlet is communicated with said inlet, means for manually shifting said valving element between said positions thereof, an actuator means having a bore therein and having first and second fluid passages communicated with said bore, a valving element extension connected to said valving element of said control valve for movement therewith and extending into said bore of said actuator means, a piston in said actuator means shiftable by pressurized fluid admitted to said first passage thereof and having means for engaging said valving element extension, to force said valving element to said second position thereof only after said piston has travelled relative to said valving element a distance at least equal to the movement needed to shift said valving element from said first to said second position thereof, second means in said actuator means shiftable in an opposite direction in response to pressurization of said second passage of said actuator means and having means for engaging said valving element extension to force said valving element to said third position thereof only after said second means has travelled relative to said valving element a distance at least equal to the movement required for shifting said valving element from said first to said third position thereof, and means for alternately pressurizing said first and second passages of said actuator means to cause said control valve to cyclically reverse the direction of operation of said motor.

2. A control system as defined in claim 1 further comprising first resilient means urging said valving element towards said first position thereof.

3. A control system as defined in claim 2 further comprising second resilient means acting on said piston for urging said piston in a direction opposite to that along which said pressurized fluid shifts said piston.

4. A control system as defined in claim 3 wherein said piston has a bore therethrough and wherein said valving element extension extends into said bore at one end of said piston, and wherein said second means comprises a plunger extending into the other end of said piston and being slidably supported therein, the end of said plunger which is most distant from said valving extension being exposed to pressurized fluid received through said second passage of said actuator means.

5. A control system as defined in claim 4 wherein said motor control valve is a spool valve having a housing with a bore and wherein said valving element is a spool disposed coaxially in said bore for axial movement therein and wherein said valving element extension extends axially from one end of said spool, said actuator means having a second housing with said bore thereof being substantially coaxial with said bore of said control valve housing to receive said valving element extension, said piston being a stepped cylinder disposed coaxially in said actuator means bore and said plunger being mounted coaxially in said piston.

6. A control system as defined in claim 5 wherein the end of said piston closest to said control valve has an inside diameter substantially greater than the outside diameter of said valving element extension and has an outside diameter substantially smaller than the inside diameter of said actuator means bore whereby slight misalignment of said control valve housing bore and said actuator means bore does not interfere with operation of said control valve and said actuator means, further comprising a cylindrical sleeve disposed coaxially within said bore of said actuator means and encircling said closest end of said piston in radially spaced relationship therewith, an annular seal element disposed coaxially on said piston adjacent said sleeve, and means carried on said piston for causing said sleeve to maintain pressure on said seal element.

7. A control system as defined in claim 1 wherein said means for alternately pressurizing said first and second passages of said actuator means comprises a first flow conduit for connection to said first port of said motor, first pressure sensing means for transmitting pressurized fluid to said first passage of said actuator means in response to a predetermined pressure rise at said first flow conduit, a second flow conduit for connection to said second port of said motor, and second pressure sensing means for transmitting pressurized fluid to said second passage of said actuator means in response to a predetermined pressure rise at said second flow conduit.

8. A control system as defined in claim 1 wherein said means for alternately pressurizing said first and second passages of said actuator means comprises a source of pressurized fluid, a pilot operated reversing valve connected between said source and said first and second passages of said actuator means and having a first position at which fluid from said source is transmitted to said first passage while said second passage is vented and having a second position at which fluid from said source is transmitted to said second passage while said first passage is vented, a first sequencing valve connected to said source and said reversing valve and having first pilot means for connection to said first motor port and having means for piloting said reversing valve to said first position thereof in response to a predetermined pressure rise at said first pilot means, and a second sequencing valve connected to said source and said reversing valve and having second pilot means for connection to said second motor port and having means for piloting said reversing valve to said second position thereof in response to a predetermined pressure rise at said second pilot means.

9. A control system as defined in claim 8 wherein said source of pressurized fluid is communicated with said reversing valve and said first and second sequencing valves through a fluid supply conduit, further comprising an on-off valve connected between said source and said fluid supply conduit and having a first position at which said supply conduit is vented and a second position at which said source is communicated with said supply conduit.

10. In a control system for a reversible fluid pressure operated motor, the combination comprising:

a motor control valve having a housing with a bore therein and a fluid inlet situated between a pair of fluid outlets and drain means, said control valve having a spool disposed in said bore for axial movement therein between a first centered position at which both of said outlets are closed and a second position at which said inlet is communicated with a first of said outlets while the other of said outlets is communicated with said drain means and a third position at which said inlet is communicated with said other outlet while said first outlet is communicated with said drain means, said spool having an axially directed extension at one end thereof, first resilient means urging said spool towards said centered position thereof, manually operated means for selectively forcing said spool to either of said second and said third positions thereof, actuator housing means disposed adjacent said control valve housing and having a bore extending substantially coaxially with respect to said bore of said control valve with said spool extension being received in a first end of said bore of said actuator housing means, said actuator housing means having a closure at the other end of said bore thereof and having a first control fluid passage communicating with an intermediate region of said bore thereof and a second control fluid passage communicating with said other end thereof, a hollow stepped piston disposed coaxially in said bore of said actuator means and having a bore with a step therein through which spool extension extends, second resilient means urging said piston towards a first position at which said step is spaced from the end of said spool extension a distance at least equal to the distance that said spool must be manually moved to shift from said first to said second position thereof, means for causing fluid pressure at said intermediate region of said actuator means bore to force said piston towards said other end thereof, means on said spool extension end positioned to be contacted by said step of said piston after said piston has travelled said distance whereby further piston travel shifts said spool to said first position thereof, and a plunger mounted in said piston for axial movement relative thereto between a first position at which an end of said plunger is spaced from said end of said spool extension by a distance at least equal to the distance that said spool must be manually moved to shift from said first to said third position thereof and a second position at which said end of said plunger has contacted said end of said spool extension and forced said spool to said third position thereof, the other end of said plunger being exposed to fluid pressure within said other end of said actuator means bore.

* * * * *